US011799801B2

(12) United States Patent
Hirasawa et al.

(10) Patent No.: US 11,799,801 B2
(45) Date of Patent: Oct. 24, 2023

(54) TRANSFER DEVICE, TRANSFER SYSTEM, TRANSFER METHOD, AND PROGRAM

(71) Applicant: Nippon Telegraph and Telephone Corporation, Tokyo (JP)

(72) Inventors: Takayoshi Hirasawa, Tokyo (JP); Hitoshi Irino, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 102 days.

(21) Appl. No.: 17/264,890

(22) PCT Filed: Jul. 23, 2019

(86) PCT No.: PCT/JP2019/028883
§ 371 (c)(1),
(2) Date: Feb. 1, 2021

(87) PCT Pub. No.: WO2020/031687
PCT Pub. Date: Feb. 13, 2020

(65) Prior Publication Data
US 2021/0306285 A1 Sep. 30, 2021

(30) Foreign Application Priority Data
Aug. 7, 2018 (JP) ................................ 2018-148897

(51) Int. Cl.
*H04L 49/253* (2022.01)
*H04L 49/15* (2022.01)
(Continued)

(52) U.S. Cl.
CPC ........ *H04L 49/254* (2013.01); *H04L 49/1507* (2013.01); *H04L 49/557* (2013.01); *H04L 49/65* (2013.01)

(58) Field of Classification Search
CPC . H04L 49/1507; H04L 49/254; H04L 49/557; H04L 49/65; H04L 12/28
See application file for complete search history.

(56) References Cited

U.S. PATENT DOCUMENTS 5,737,320 A * 4/1998 Madonna .............. H04L 49/105
370/258
8,144,574 B1 * 3/2012 Hu .......................... H04L 49/65
370/395.5
(Continued)

FOREIGN PATENT DOCUMENTS

JP 2014-160922 9/2014
JP 2017-38209 2/2017
(Continued)

OTHER PUBLICATIONS

Casado et al. "Ethane: Taking Control of the Enterprise," ACM SIGCOMM '07, Aug. 2007, Kyoto, Japan, Total Pages: 12 (Year: 2007).*
(Continued)

*Primary Examiner* — Shah M Rahman
(74) *Attorney, Agent, or Firm* — Fish & Richardson P.C.

(57) ABSTRACT

Transfer apparatuses perform communications for path control with a centralized control apparatus that performs centralized control from the outside of a switch cluster including the group of transfer apparatuses, through a path similar to D-plane (main signal). A packet flow controller serving as a separation unit that separates a packet for the inside of the cluster and a packet for the outside of the cluster transmitted through the similar path from each other, and an internal route engine that performs path control of obtaining a path for freely passing through a plurality of paths in the cluster are provided. The packet flow controller separates a path control packet for the inside of the cluster, and the engine performs, when a failure to communicate the path control
(Continued)

packet for the inside thus separated occurs, path control of generating a path that bypasses a path with the failure.

11 Claims, 14 Drawing Sheets

(51) Int. Cl.
*H04L 49/55* (2022.01)
*H04L 49/65* (2022.01)

(56) References Cited

U.S. PATENT DOCUMENTS

| | | | |
|---|---|---|---|
| 2003/0036819 A1* | 2/2003 | Lehr | G06F 1/26 700/286 |
| 2009/0141636 A1* | 6/2009 | Dolganow | H04L 45/50 370/237 |
| 2012/0147898 A1* | 6/2012 | Koponen | H04L 49/254 370/422 |
| 2012/0239822 A1* | 9/2012 | Poulson | H04L 45/28 709/239 |
| 2013/0077481 A1* | 3/2013 | Philavong | H04L 45/66 370/410 |
| 2013/0103818 A1* | 4/2013 | Koponen | H04L 41/50 709/223 |
| 2013/0170503 A1* | 7/2013 | Ooishi | H04L 45/64 370/401 |
| 2015/0043576 A1* | 2/2015 | Dixon | H04L 45/586 370/392 |
| 2015/0207671 A1* | 7/2015 | Farkas | H04L 12/28 370/228 |
| 2015/0319081 A1* | 11/2015 | Kasturi | H04L 67/1004 709/239 |
| 2016/0105380 A1* | 4/2016 | Chhillar | H04L 49/557 370/244 |
| 2016/0119255 A1* | 4/2016 | Luo | H04L 41/0663 370/218 |
| 2016/0218917 A1* | 7/2016 | Zhang | H04L 45/42 |
| 2016/0381124 A1* | 12/2016 | Hwang | H04L 43/0817 709/226 |
| 2017/0195253 A1* | 7/2017 | Annaluru | H04L 41/40 |
| 2017/0237604 A1* | 8/2017 | Wackerly | H04L 45/22 370/218 |
| 2019/0364492 A1* | 11/2019 | Azizi | H04W 92/045 |

FOREIGN PATENT DOCUMENTS

| | | | |
|---|---|---|---|
| JP | 2017-228935 | 12/2017 | |
| WO | WO-2017122847 A1 * | 7/2017 | H04L 45/586 |

OTHER PUBLICATIONS

Akyildiz et al., "A roadmap for traffic engineering in SDN-OpenFlow networks", Computer Networks, vol. 71, Oct. 4, 2014, pp. 1-30 (Year: 2014).*
McKeown et al., "OpenFlow: Enabling Innovation in Campus Networks", ACM SIGCOMM Computer Communication Review, vol. 38, No. 2, pp. 69-74, 2008 (Year: 2008).*
Lakshminarayanan et al., "Achieving Convergence-Free Routing using Failure-Carrying Packets", ACM SIGCOMM Computer Communication Review, vol. 37, Issue 4, Oct. 2007 pp. 241-252, Online https://doi.org/10.1145/1282427.1282408 (Year: 2007).*
Fares et al., "Hedera: Dynamic Flow Scheduling for Data Center Networks", in NSDI, USENIX Association, pp. 281-296, Apr. 2010
Zhang et al., "Named Data Networking", ACM SIGCOMM Computer Communication Review, vol. 44, Issue 3, Jul. 2014, pp. 66-73 (Year: 2014).*
Cui et al., "DiFS: Distributed Flow Scheduling for Adaptive Routing in Hierarchical Data Center Networks", ANCS '14: Proceedings of the tenth ACM/IEEE symposium on Architectures for networking and communications systems, Oct. 2014, pp. 53-64 ( Year: 2014).*
Mysore et al., "PortLand: A Scalable Fault-Tolerant Layer 2 Data Center Network Fabric", SIGCOMM '09: Proceedings of the ACM SIGCOMM 2009 conference on Data communication, Aug. 2009, pp. 39-50 (Year: 2009).*
Muller et al., "Survivor: an Enhanced Controller Placement Strategy for Improving SDN Survivability", Proceedings IEEE Global Communications Conference, pp. 1909-1915, Dec. 2014 (Year: 2014).*
Bah et al., "A centralized controller to improve fault tolerance in TRILL-based fabric networks ", IEEE, 2016 3rd Smart Cloud Networks & Systems (SCNS), Dubai, United Arab Emirates, Dec. 19-21, 2016; pp. 1-6 (Year: 2016).*
Bolding et al., "Design of a Router for Fault Tolerant Networks", IEEE Transactions on Parallel and Distributed Systems, vol. 8, Issue: 8, Aug. 1997, pp. 790-802 (Year: 1997).*
Clos, "A Study of Non-Blocking Switching Networks," The Bell System Technical Journal, Mar. 1953, pp. 406-424.
Github.com, [online], "Multi-Service Fabric (MSF)," 2018, retrieved on Jun. 12, 2018, retrieved from URL<https://github.com/multi-service-fabric/msf>, 3 pages.
Guide.opencord.org, [online], "CORD Installing a physical PoD," 2018, retrieved from URL<https://guide.opencord.org/cord5.0/install_physical.html>, 13 pages.
Hirasawa et al., "A study of high reliability on controlling multiple physical nodes," IEICE, Technical Report, Mar. 1, 2018, pp. 27-32, 13 pages (with English Translation).
Hirasawa et al., "A study of inter-controller synchronous traffic in distributed cooperative openflow controller," IEICE 2017 Communication Society Conference Proceedings 2, Aug. 2017, p. 19, 3 pages (with English Translation).
Onosproject.org, [online], "Enabling next-generation solutions in service provider networks," 2018, retrieved from URL<https://onosproject.org/>, 1 page.

* cited by examiner

TRANSFER DEVICE, TRANSFER SYSTEM, TRANSFER METHOD, AND PROGRAM

CROSS-REFERENCE TO RELATED APPLICATIONS

This application is a National Stage application under 35 U.S.C. § 371 of International Application No. PCT/JP2019/028883, having an International Filing Date of Jul. 23, 2019, which claims priority to Japanese Application Serial No. 2018-148897, filed on Aug. 7, 2018. The disclosure of the prior application is considered part of the disclosure of this application, and is incorporated in its entirety into this application.

TECHNICAL FIELD

The present invention relates to a transfer apparatus, a transfer system, a transfer method and a program that perform enhanced control for communication paths for a group of transfer apparatuses (switch cluster) forming a communication network as well as automatic path switching control in response to an occurrence of failure on the communication path.

BACKGROUND ART

Recent development of Over The Top (OTT) has accelerated the market of general-purpose switches for data centers dedicated to general purpose transfer functions. Communication carriers have been considering switching from the conventional approach including transfer apparatuses dedicated for carriers, to using a group of general-purpose apparatuses (Patent Literature 1).

FIG. 10 illustrates an example of a configuration of a related-art transfer apparatus. This transfer apparatus 10 is configured to have three functions accommodated in a single package, the three functions including: a management function 10a for controlling the transfer apparatus 10; a routing function 10b for controlling a path for connecting to another transfer apparatus, and a packet transfer function 10c for transferring packets.

FIG. 11 illustrates the inside of the transfer apparatus 10 where fabric cards 13a and 13b and line cards 14a, 14b, and 14c are incorporated, and controlled by a Network Operating System (NOS) 12. These two types of apparatus components (the fabric cards 13a and 13b and the line cards 14a, 14b, and 14c) are connected to each other by a Clos topology 15.

FIG. 12 illustrates a related-art transfer system including the management function 10a separately accommodated in an external server 11 and a group of transfer apparatuses 11a, 11b, 11c, 11d, and 11e controlled by this management function 10a. In this configuration, each of the transfer apparatuses 11a to 11e includes the packet transfer function 10c. The routing function 10b is provided to any one of the server 11 and each of the transfer apparatuses 11a to 11e.

The transfer apparatuses 11a to 11e of the transmission system illustrated in FIG. 12 accommodate components illustrated in FIG. 13 in the following manner. The transfer apparatus 11a is a spine switch (SW) 17a, the transfer apparatus 11b is a spine SW 17b, the transfer apparatus 11c is a leaf SW 18a, the transfer apparatus 11d is a leaf SW 18b, and the transfer apparatus 11e is a leaf SW 18e.

The transfer system illustrated in FIG. 13 is configured in such a manner that two types of apparatus components (the spine SWs 17a and 17b and the leaf SWs 18a, 18b, and 18c), controlled by a controller (CTL) 16a installed in a server 16, are connected to each other by a Clos topology 19. The spine SWs 17a and 17b and the leaf SWs 18a to 18c, connected to each other by the Clos topology 19, form a switch cluster 20. With this configuration, large volume transfer is achieved (Non Patent Literature 1).

In the communication network configuration as illustrated in FIG. 13 that is expected to guarantee transfer capacity similar to that of a related-art transfer apparatus in the future, adaptation of a configuration in which traffic is processed by combining a plurality of transfer apparatuses has been under study.

Existing architectures for controlling a group of a plurality of general-purpose transfer apparatuses include an autonomous distributed system (Non Patent Literature 2) and a centralized control system (Non Patent Literatures 3 and 4). FIG. 14 illustrates an autonomous distributed transfer system 21 and FIG. 15 illustrates a centralized control transfer system 31.

The autonomous distributed transfer system 21 illustrated in FIG. 14 includes an external server 22 equipped with an NOS CTL 22a serving as the control function; and a group of transfer apparatuses 24a to 24e controlled by the NOS CTL 22a via a management SW 23. Each of the transfer apparatuses 24a to 24e includes an NOS implementing the routing function and the packet transfer function. With the NOS serving as an autonomous path resolving function thus provided to each of the transfer apparatuses 24a to 24e, even when connection with the NOS CTL 22a is fails, the NOSs on the respective transfer apparatuses 24a to 24e can autonomously establish a path. This provides an advantage that communication network reliability can be maintained at a level similar to that in the related-art configuration.

However, an increase in the number of physical transfer apparatuses 24a to 24e involves an increase in path information which affects the communication network as a whole. Replacement using the system 21 illustrated in FIG. 14 is difficult to implement without affecting the periphery, because the increase in the number of the dedicated transfer apparatuses 24a to 24e used in the existing network involves an increase in the path information that affects the network as a whole. In view of this, the centralized control transfer system as described below is implemented.

The centralized control transfer system 31 illustrated in FIG. 15 includes an external server 32 equipped with Routing/Forwarding (R/F) CTL 32a that performs R/F control, and a group of transfer apparatuses 34a to 34e. The R/F CTL 32a has a routing function and a forwarding control function. The group of transfer apparatuses 34a to 34e has the packet transfer function, and is controlled by the R/F CTL 32a via a management SW 33.

In such a centralized control transfer system 31, the R/F CTL 32a provided separately and externally from the plurality of transfer apparatuses 34a to 34e performs centralized control for path establishment. Thus, the system has an advantage of enabling the transfer apparatuses to be controlled as a logical node, so that the number of physical transfer apparatuses needs not to be taken into consideration for path information exchange.

FIG. 16 illustrates an example of implementation of a transfer system described in Non Patent Literature 5. The centralized control transfer system 31 illustrated in FIG. 15 described above lacks redundancy, because only a single control line indicated by a dashed line can be connected to each of the transfer apparatuses 34a to 34e from the R/F CTL 32a. On the other hand, in a centralized control transfer system 41 illustrated in FIG. 16, a data transfer line 43 is further used, so that a configuration not relying on only a single control line as illustrated in FIG. 15 is achieved.

In FIG. 16, additional functions 47 are connected to respective transfer apparatuses 42a and 42b via management ports 48, for performing centralized control further using a path similar to D-plane (main signal) from the CTL 45. External servers 43a and 43b are respectively connected to the transfer apparatuses 42a and 42b via the management ports 48. Furthermore, external apparatuses 44a and 44b are respectively connected to the transfer apparatuses 42a and 42b via D-plane ports 46.

CITATION LIST

Patent Literature

Patent Literature 1: JP 2017-38209 A

Non Patent Literature

Non Patent Literature 1: C. Clos, "A Study of Non-Blocking Switching Networks." The Bell System technical Journal, 32(2): 406 to 424, March 1953.
Non Patent Literature 2: "Multi-Service Fabric (MSF)", [online]. 2018 GitHub, Inc, [Search on Jul. 18, 2018], Internet <URL: https:/github.com/multi-service-fabric/msf>
Non Patent Literature 3: ONF, "Enabling next-generation solutions in service provider networks", [online], 2018, [Search on Jul. 18, 2018], Internet <URL: https://onos-project.org/>
Non Patent Literature 4: ONF, "CORD Installing a physical PoD", [online], 2018, [Search on Jul. 18, 2018], Internet <URL: https://guide.opencord.org/cord-5.0/install-_physical.html>
Non Patent Literature 5: Takayoshi Hirasawa, and two others, "A study of high reliability on controlling multiple physical nodes as a single logical node", TEICE technical report, NS2017-172, pp. 27-32.

SUMMARY OF THE INVENTION

Technical Problem

In Non Patent Literatures 3 to 5 described above, a centralized control technique (Openflow) is employed. Specifically, a plurality of transfer apparatuses forming a communication network are managed by centralized control performed by a single centralized control apparatus (CTL). However, in many cases, transfer apparatuses supporting the centralized control technique only have one management port for connection with the centralized control apparatus. Thus, the plurality of transfer apparatuses are collectively connected to the centralized control apparatus by a management switch (see the management SWs 23 and 33 in FIG. 15). Thus, there is a problem in that this collective connection point becomes a single point of failure. There is a further problem in that traffic between the centralized control apparatus and the transfer apparatuses is concentrated on a specific path.

In addition, a technique, one example of which is illustrated in FIG. 16 has been proposed in which communications for controlling the transfer apparatuses from the centralized control apparatus (CTL 45) installed in an external server and the like are implemented using a path similar to D-plane (main signal). However, data transfer within the switch cluster is performed with a destination port designated statically (unchangeably). This means that there is no bypass path selection function. Thus, when a failure occurs in the switch cluster (for example, a path failure indicated by the x mark in FIG. 16), the communications with the centralized control apparatus is interrupted.

Specifically, as illustrated in FIG. 17, a communication failure occurs as follows in a scenario where a CTL 51, provided in an unillustrated external server and performs centralized control, is communicating with transfer apparatuses 52a to 52d using paths similar to D-plane (main signal) as indicated by arrows Y2 to Y5. More specifically, as indicated by the x mark in FIG. 17, when a failure such as a disconnection occurs on the path between the transfer apparatus 52a and the transfer apparatus 52d, the CTL 51 cannot perform communications indicated by the arrows Y2 and Y3 with the transfer apparatuses 52b and 52d, due to the lack of bypass path selection function.

The present invention is made in view of the above, and an object of the present invention is to provide a transfer apparatus, a transfer system, a transfer method and a program that enable connection between the centralized control apparatus and a group of transfer apparatuses to have no single point of failure, and also enable traffic to be distributed among a plurality of paths so that a bypass path can be selected when a failure occurs in a switch cluster.

Means for Solving the Problem

A first aspect of the present invention for solving the problem described above is a transfer apparatus that performs communications for path control with a centralized control apparatus via a main signal path, the centralized control apparatus performing centralized control from outside on a switch cluster including a group of transfer apparatuses formed by connecting the transfer apparatus to another transfer apparatus through a communication path, the transfer apparatus including a separation unit configured to separate a packet for inside of the switch cluster and a packet for outside of the switch cluster for performing the path control outside of the switch cluster that are transmitted on the main signal path, from each other, and an internal path control unit configured to perform the path control inside the switch cluster, wherein the separation unit separates a path control packet for the inside of the switch cluster, and the internal path control unit performs the path control inside the switch cluster using the separated path control packet for the inside.

A seventh aspect of the present invention is a transfer method performed by a transfer apparatus that performs communications for path control with a centralized control apparatus via a main signal path, the centralized control apparatus performing centralized control from outside on a switch cluster including a group of transfer apparatuses formed by connecting the transfer apparatus to another transfer apparatus through a communication path, the method including steps performed by the transfer apparatus of separating a packet for inside of the switch cluster and a packet for outside of the switch cluster that are transmitted on the main signal path, from each other, performing path control of obtaining a path for freely passing through a plurality of paths inside the switch cluster, and performing path control of separating a path control packet for the inside of the switch cluster by the separating, and generating, when failure to communicate the separated path control packet for the inside occurs, a path that bypasses a path with the failure.

An eighth aspect of the present invention is a non-transitory computer-readable storage medium that stores a computer-executable program for causing a computer serving as a transfer apparatus that performs communications for path control with a centralized control apparatus via a main signal path, the centralized control apparatus performing centralized control from outside on a switch cluster including a group of transfer apparatuses formed by connecting the transfer apparatus to another transfer apparatus through a communication path, to function as a unit configured to separate a packet for inside of the switch cluster and a packet for outside of the switch cluster that are transmitted on the main signal path, from each other, a unit configured to perform path control of obtaining a path for freely passing through a plurality of paths inside the switch cluster, a unit configured to perform path control of separating a path control packet for the inside of the switch cluster by the separating, and generating, when failure to communicate the separated path control packet for the inside occurs, a path that bypasses a path with the failure, and a unit configured to give notice on information on a path inside the switch cluster and information on a path outside the switch cluster, as path information to be used by a packet transfer function.

With the configuration according to the first aspect, the method according to the seventh aspect, and the program according to the eighth aspect, the packet for the inside of the switch cluster (also referred to as a cluster) and the packet for the outside of the cluster can be separated from each other, whereby dynamic path control in the cluster can be performed independently from the path outside the cluster. Thus, the cluster and the centralized control apparatus outside the cluster can be prevented from having a single point of failure therebetween. Furthermore, in response to a failure of a transfer apparatus or a path in the cluster, a path that bypasses this failed path (bypass path) can be generated so that the communications that have been going on before the failure can be maintained.

A second aspect of the present invention is the transfer apparatus according to the first aspect, wherein when the group of transfer apparatuses are connected to each other through a plurality of paths in the switch cluster, the internal path control unit performs the path control to further enable communications related to the main signal path to be distributed among the plurality of paths.

With this configuration, when there are a plurality of paths in the cluster, communications with the centralized control apparatus can be distributed among the plurality of paths. Thus, the cluster and the centralized control apparatus outside the cluster can be prevented from having a single point of failure therebetween.

A third aspect of the present invention is the transfer apparatus according to the first or second aspect, wherein the internal path control unit performs the path control on a path inside the switch cluster independently from a path outside the switch cluster.

With this configuration, the internal paths of the cluster are controlled independently from the external paths, whereby a bypass path can be generated in response to detection of a failure in the cluster to maintain the communications that have been going on before the failure.

A fourth aspect of the present invention is the transfer apparatus according to any one of the first to third aspects, further including an external route agent configured to transfer to the centralized control apparatus, the path control packet for the outside of the switch cluster, separated by the separation unit.

With this configuration, the path control packets for the outside of the cluster can be transferred to the centralized control apparatus independently from the path control packet for the inside, whereby the centralized control apparatus can easily perform path control outside the cluster.

A fifth aspect of the present invention is the transfer apparatus according to any one of the first to fourth aspect, wherein the internal path control unit controls the communications between the centralized control apparatus and the transfer apparatuses inside the switch cluster to be performed through a path inside the switch cluster.

With this configuration, communications between the centralized control apparatus and each of the transfer apparatuses inside the cluster can be performed through a bypass path generated by the internal path control unit or the like.

A sixth aspect of the present invention is a transfer system including a switch cluster including a group of transfer apparatuses formed by connecting a transfer apparatus to another transfer apparatus through a communication path, and a centralized control apparatus configured to perform centralized control on the switch cluster from outside, the centralized control apparatus performing communications for path control on the switch cluster via a main signal path, wherein the centralized control apparatus performs, based on a path control packet for the outside of the switch cluster, control on a path to the outside to enable the switch cluster to be regarded as a single node from the outside of the switch cluster.

With this configuration, communications can be performed with the group of transfer apparatuses in the cluster regarded as a single node from the outside of the cluster. Thus, communications with the group of transfer apparatuses can be simplified.

Effects of the Invention

The present invention can provide a transfer apparatus, a transfer system, a transfer method and a program that enable connection between the centralized control apparatus and a group of transfer apparatuses to have no single point of failure, and also enable traffic to be distributed among a plurality of paths so that a bypass path can be selected when a failure occurs in a switch cluster.

DESCRIPTION OF EMBODIMENT

An embodiment of the present invention will be described below with reference to the drawings. Here, components with corresponding functions are denoted by the same reference signs throughout all drawings of the present specification and description thereof will be omitted as appropriate.

Configuration of Embodiment

Figure 1:
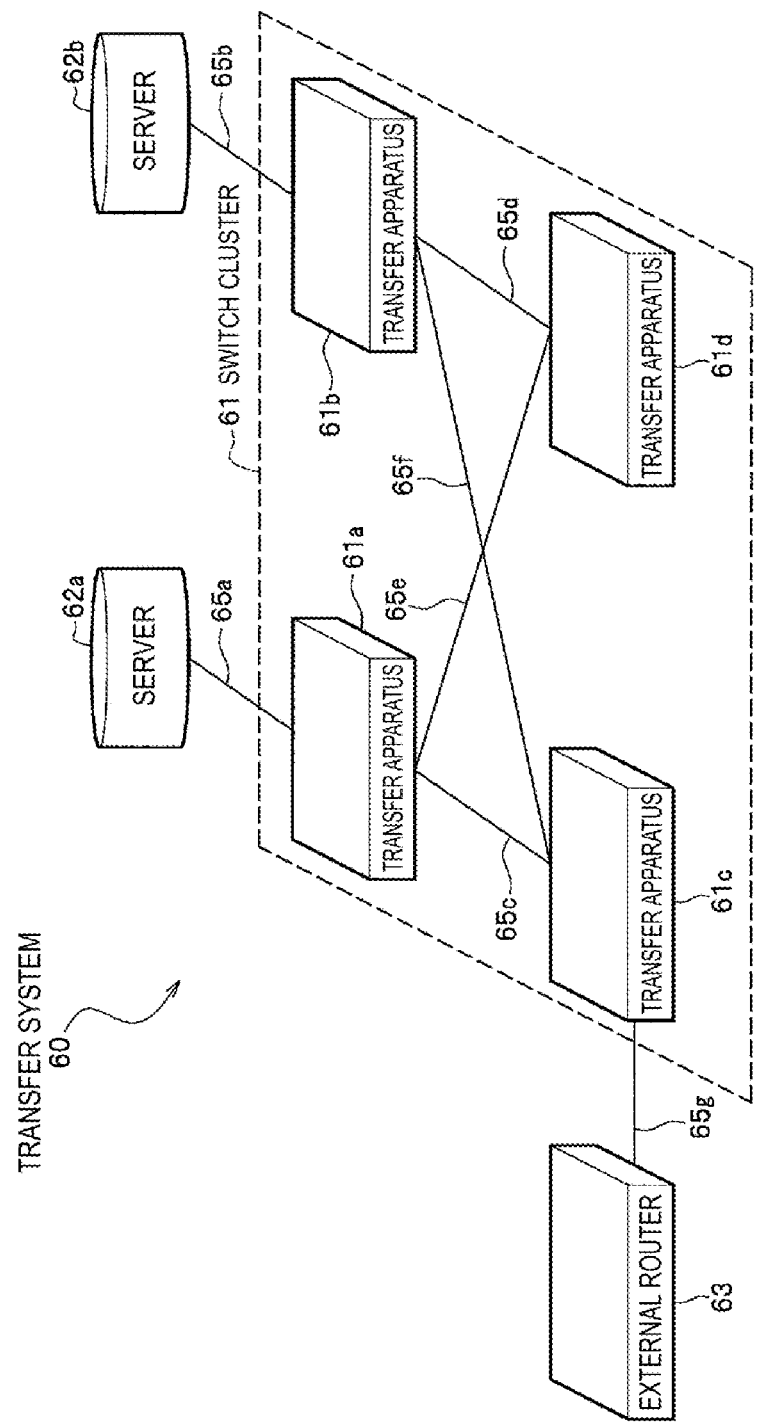
FIG. 1 is a block diagram illustrating a configuration of a transfer system using transfer apparatuses according to an embodiment of the present invention.

FIG. 1 is a block diagram illustrating a configuration of a transfer system using transfer apparatuses according to an embodiment of the present invention.

A transfer system 60 illustrated in FIG. 1 includes a plurality of transfer apparatuses 61a, 61b, 61c, and 61d and a plurality of servers 62a and 62b connected to a switch cluster (cluster) 61 including the group of transfer apparatuses 61a to 61d. An external router 63 is provided outside of the cluster 61 and is connected to the cluster 61. These components are connected to each other through paths 65a to 65g, such as an optical fiber or a conductive wire.

The present embodiment features each of the transfer apparatuses 61a to 61d having a function (a packet flow controller 87 illustrated in FIG. 4) of separating a path control packet transmitted through a path similar to D-plane (main signal) from the inside of the cluster 61 (hereinafter, referred to as cluster internal) and a path control packet transmitted through a path similar to D-plane (main signal) from outside of the cluster 61 (hereinafter, referred to as outside the cluster) from each other. With this separation function, the path control packets inside the cluster and the path control packets outside the cluster are separated from each other. A path control engine (internal route engine 85 in FIG. 4) for the inside of the cluster performs path control on the basis of the cluster internal path control packet. An external route agent 84 (FIG. 4) transfers the path control packets outside the cluster, to a centralized control apparatus (centralized control apparatus 73 in FIG. 4) installed in the servers 62a and 62b.

This enables dynamic path control to be performed in the cluster independently from paths outside the cluster. Thus, the cluster 61 and the centralized control apparatus 73 (FIG. 4) outside the cluster 61 can be prevented from having a single point of failure therebetween. Furthermore, when a failure occurs inside the cluster, a bypass path is formed so that the failure can be prevented. Furthermore, if there are a plurality of paths inside the cluster, communications with the centralized control apparatus 73 can be distributed among a plurality of paths.

Figure 2:
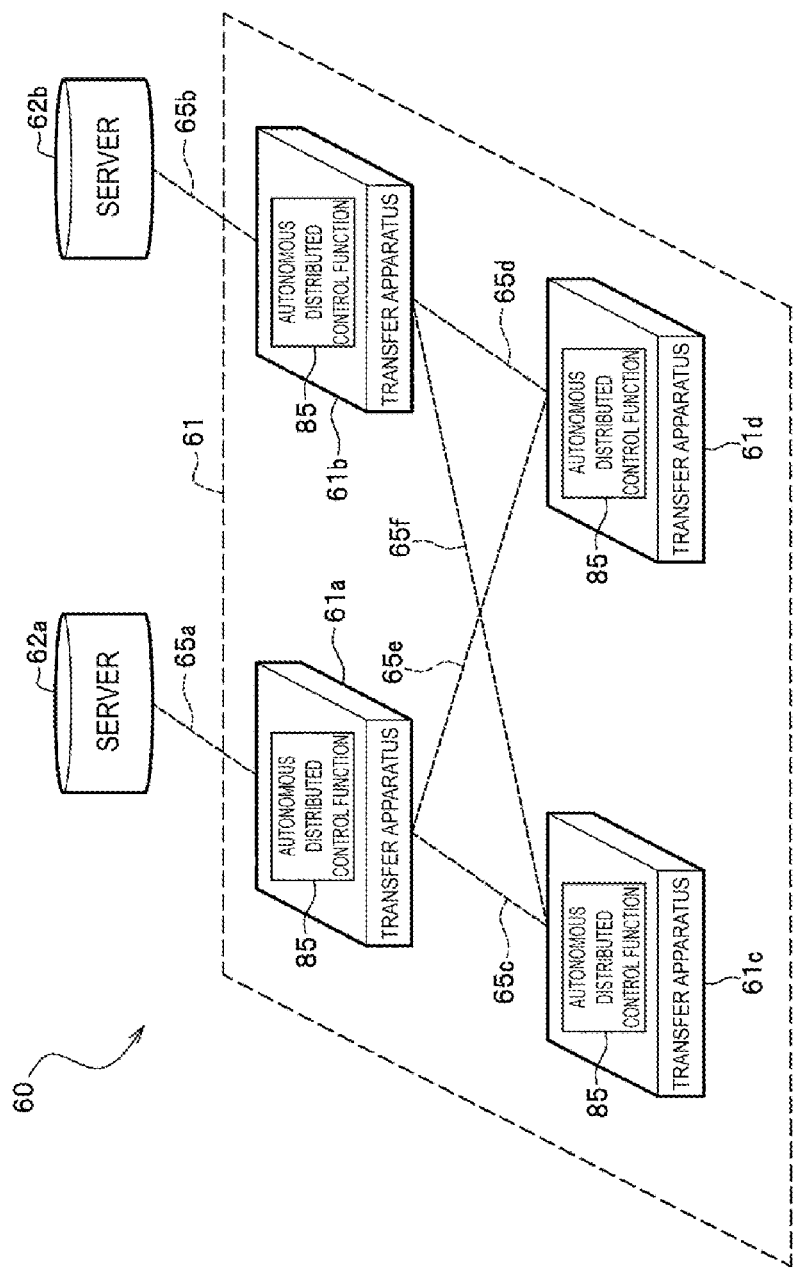
FIG. 2 is a block diagram illustrating a configuration of paths inside a switch cluster of the transfer system according to the present embodiment.

As illustrated in FIG. 2, each of the transfer apparatuses 61a to 61d includes an autonomous distributed control function 85 (corresponding to the internal route engine 85 in FIG. 4) that executes autonomous path switching control processing using the cluster internal path control packet which is one of the packets separated from each other. Thus, the path inside the cluster is controlled independently from the path outside the cluster.

The autonomous distributed control function 85 has the function of autonomously switching among the paths 65a to 65f for communications (communications for centralized control) with the centralized control apparatus 73 automatically in response to the following failure, to use a path with which a point of failure can be prevented so that the communications can be maintained on a path similar to D-plane (main signal). The expression "following failure" as described above includes a failure (apparatus failure) of the transfer apparatuses 61a to 61d and a failure (path failure) of the path 65c to 65f in the cluster. Furthermore, the autonomous distributed control function 85 has a function of autonomously switching among paths so that the communications can be maintained also in a case where an apparatus or a path is added to or removed from the transfer apparatuses 61a to 61d or the paths in the cluster.

Still, the autonomous distributed control function 85 for the inside of the cluster, on each of the transfer apparatuses 61a to 61d, performs path exchange for an Internet Protocol (IP) address used for communications for centralized control, using a path similar to D-plane (main signal). This configuration is for enabling the communications for centralized control to be performed on a path similar to D-plane (main signal).

Figure 14:
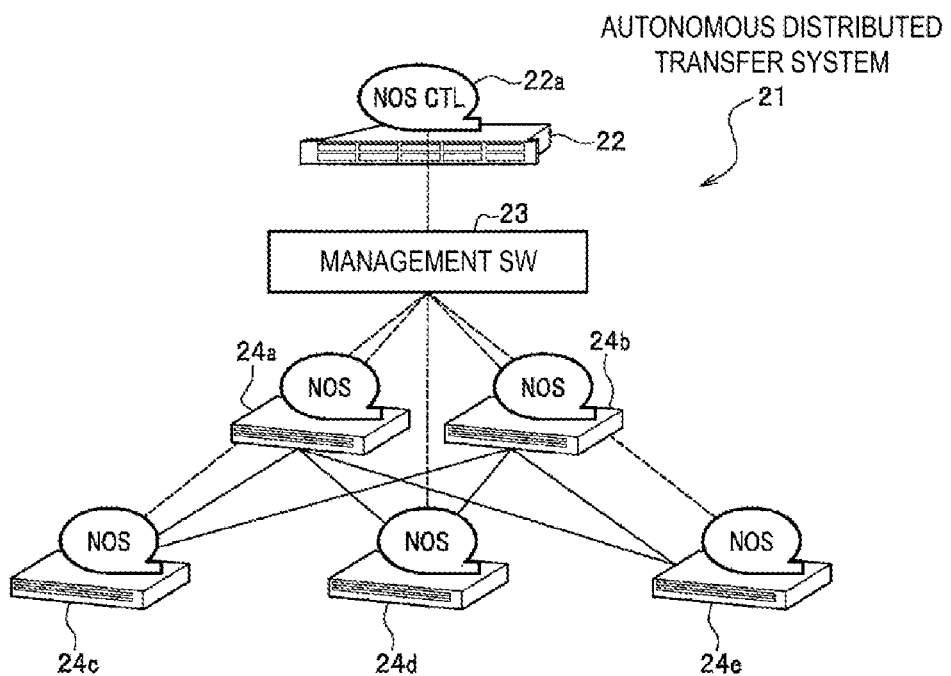
FIG. 14 is a block diagram illustrating a configuration of an autonomous distributed transfer system.
Figure 15:
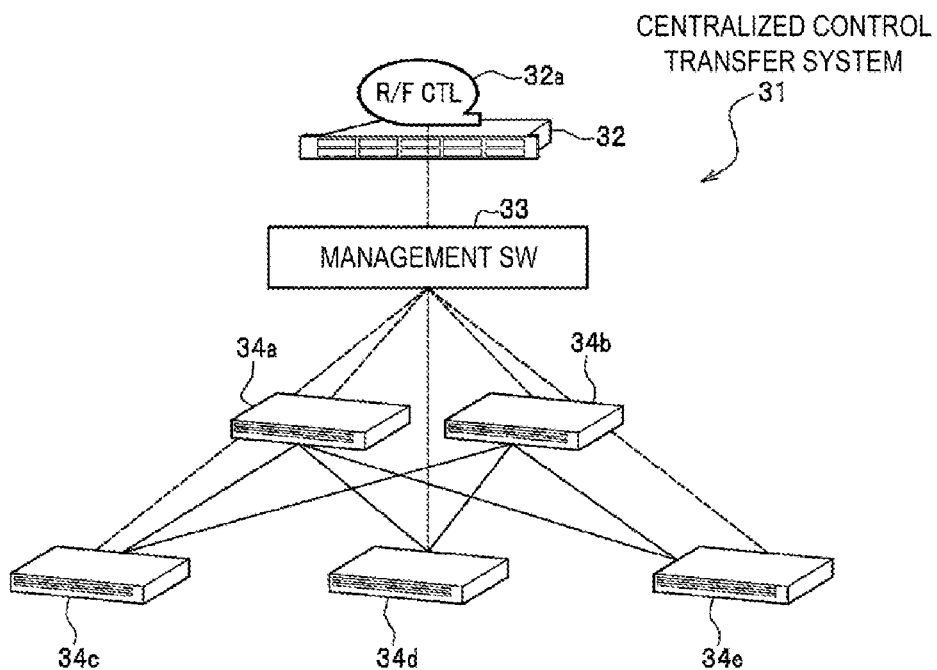
FIG. 15 is a block diagram illustrating a configuration of a centralized control transfer system.
Figure 16:
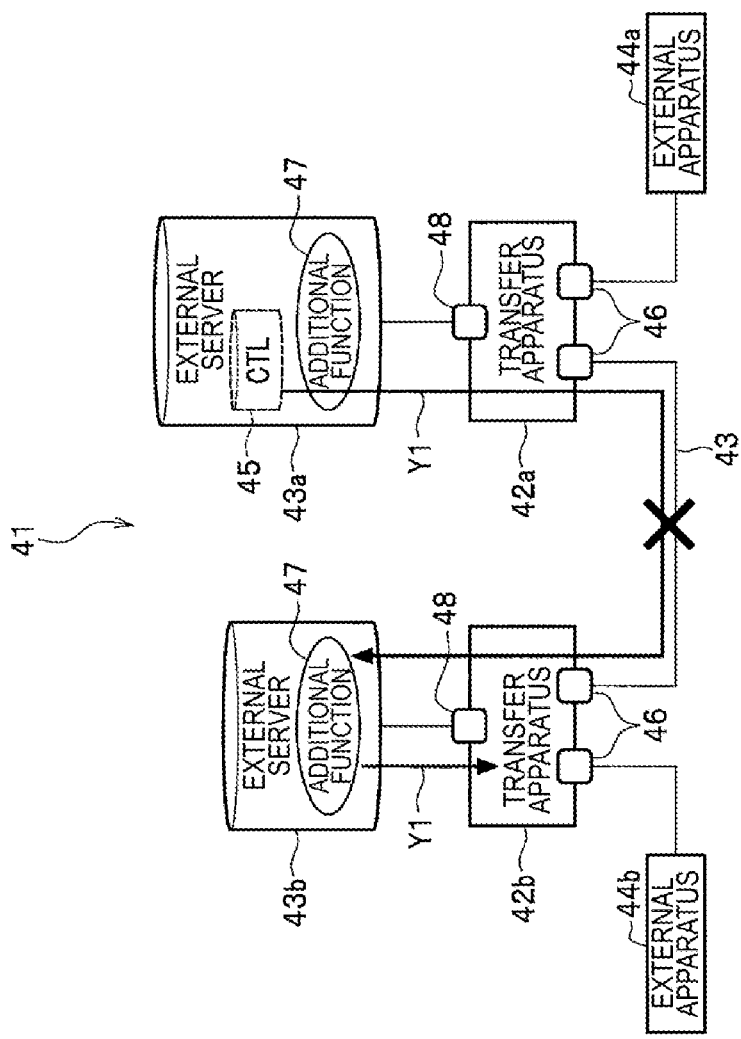
FIG. 16 is a block diagram illustrating a configuration in a related-art centralized control transfer system not relying on a single control line only.
Figure 17:
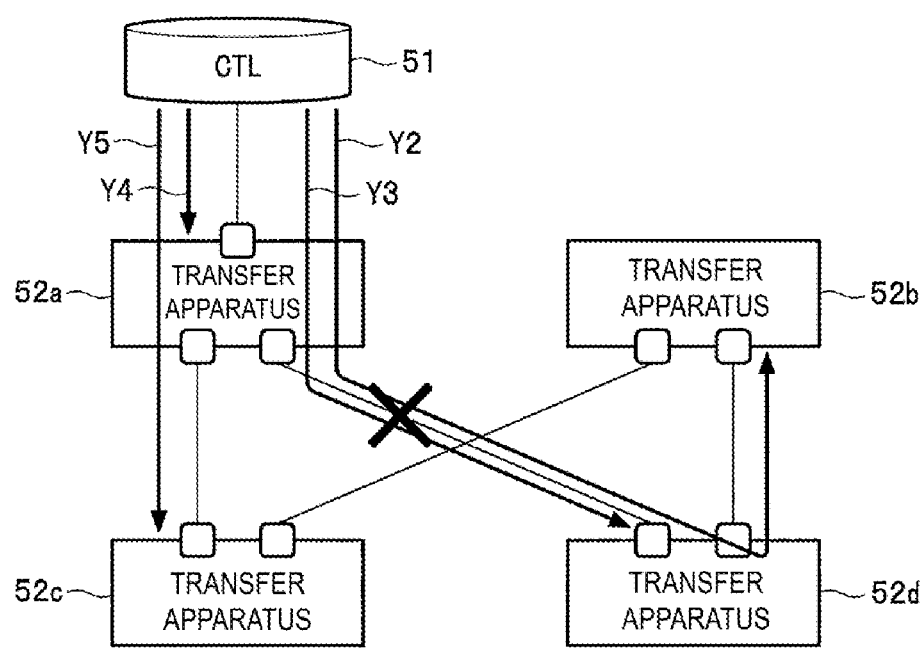
FIG. 17 is a block diagram illustrating a state in which a failure has occurred on a path between transfer apparatuses in the related-art transfer system.

The autonomous distributed control function 85 also has a routing function of monitoring the status of the paths 65c to 65f in the cluster, and selecting a path when a path failure occurs. The routing function includes a routing protocol (protocol) used for resolving the failure of the paths 65c to 65f in the cluster. The routing function also executes processing of autonomously providing solution for continuity of transfer between each of the transfer apparatuses 61a to 61d and the centralized control apparatus 73, as in the case of the autonomous distributed transfer performed by the autonomous distributed transfer system 21 described above (FIG. 14). In other words, when there are a plurality of cluster internal paths, communications between each of the transfer apparatuses 61a to 61d and the centralized control apparatus 73 may be processed to be distributed among the plurality of paths.

In the cluster, the above described protocol may be any protocol that dynamically acquires a path status and autonomously implements path calculation, such as Open Shortest Path First (OSPF) or Intermediate System to Intermediate System (IS-IS). The same protocol may be used for the path information from the outside of the cluster. In such a case, the path information will be processed by the centralized control apparatus 73.

Figure 3:
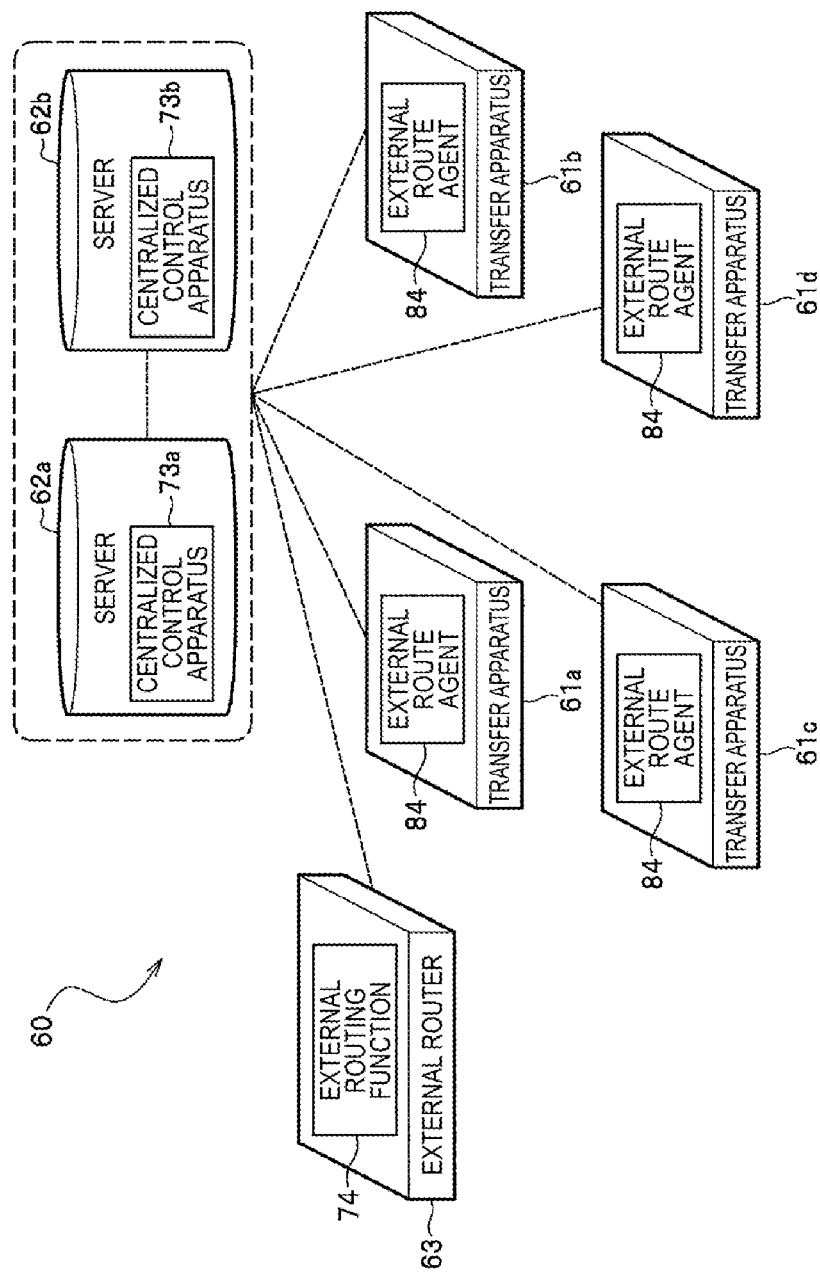
FIG. 3 is a block diagram illustrating a configuration of paths outside the switch cluster of the transfer system according to the present embodiment and centralized control connection between a centralized control apparatus and the switch cluster.

The packet transfer from the centralized control apparatus 73 to each of the transfer apparatuses 61a to 61d is performed with the external route agent 84, provided to each of the transfer apparatuses 61a to 61d, relaying the transfer from the centralized control apparatus 73 as illustrated in FIG. 3. This expression "relaying" means that the following operation is performed in response to the centralized control apparatus 73 instructing a particular transfer apparatus 61a to output a packet. The expression "following operation" described above includes issuing a packet output instruction from the centralized control apparatus 73 to the external route agent 84 and outputting the packet, output from the external route agent 84, to another transfer apparatus 61b from the transfer apparatus 61a.

Furthermore, the external route agent 84 on each of the transfer apparatuses 61a to 61d receives a path instruction through centralized control by the centralized control apparatus 73. This instructed path may be one or both of a path via a management port (management port 81 illustrated in FIG. 4) and a path via a D-plane communication port. For communications from the outside of the cluster 61, the centralized control apparatus 73 that has received a path control packet from the outside performs centralized control on the cluster 61. An instruction for this centralized control is received by the external route agent 84.

As illustrated in FIG. 3, the communications from the outside of the cluster 61 described above are implemented with the external routing function 74 of the external router 63, provided outside the transfer system 60, transferring an external path control packet to the centralized control apparatus 73 in the following manner. The expression "transferring in the following manner" described above means that the external routing function 74 of the external router 63 transfers the external path control packet, via the transfer apparatuses 61a to 61d in the cluster 61 directly connected and via the external route agent 84 on the apparatus.

With this configuration, the transfer apparatuses 61a to 61d execute processing of autonomously providing solution for path connection in the cluster when an apparatus or a path in the cluster fails. Thus, the communications between the cluster 61 and the centralized control apparatus 73, via one or both of the management port (the management port 81 in FIG. 4) and the D-plane communication port, can be maintained. The routing function enables the plurality of paths 65c to 65f in the cluster to be concurrently used in accordance with the routing protocol, so that the band can be used efficiently.

Moreover, communications (internal communication) for resolving path failure in the cluster and communications from outside of the cluster (external communication) are distinguished from each other by the separation function provided to the transfer apparatuses 61a to 61d. Conditions for the distinction are implemented using unique information such as a Media Access Control (MAC) address, an IP address, and a Virtual Local Area Network (VLAN) number. Note that the unique information pieces may be used in combination.

With the above described mechanism separating the internal communications and the external communications from each other, a transfer apparatus outside the cluster will not be affected by the path as a result of the autonomous distributed resolution in the cluster. Thus, the group of transfer apparatuses 61a to 61d of the cluster 61 can be regarded as a single logical node from the outside of the cluster. Furthermore, in the cluster, autonomously distributed cooperation among the plurality of transfer apparatuses 61a to 61d can be implemented.

Figure 4:
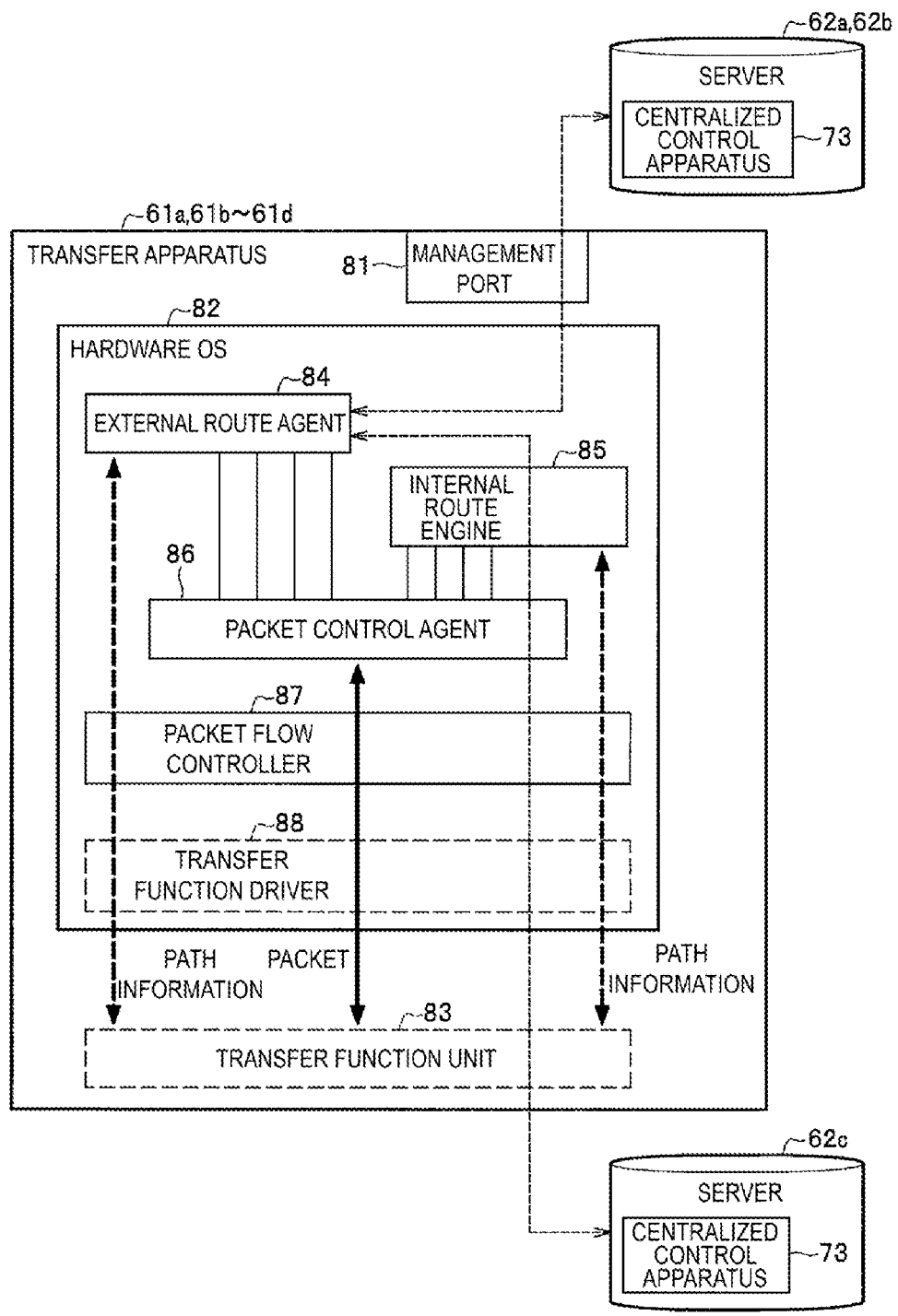
FIG. 4 is a block diagram illustrating a functional configuration of the transfer apparatus according to the present embodiment.

FIG. 4 is a block diagram representatively illustrating a configuration of the transfer apparatus 61a of the transfer apparatuses 61a to 61d with the same configuration.

The transfer apparatus 61a illustrated in FIG. 4 includes the management port 81, a transfer function unit 83 including an ASIC for implementing high speed/large volume hardware transfer, and a calculation processing unit for implementing software processing by the CPU. The calculation processing unit includes a hardware OS 82. The external route agent 84, an internal route engine 85, a packet control agent 86, the packet flow controller 87, and a transfer function driver (also referred to as a driver) 88 run on this OS 82.

The transfer function unit 83 is formed of a semiconductor integrated circuit such as an Application Specific Integrated Circuit (ASIC), enabling high speed and large volume transfer. The transfer function unit 83 also includes a transfer destination port so that packets can be transferred on the basis of a forwarding rule written using the port.

Note that the internal route engine 85 corresponds to the above-described autonomous distributed control function, and serves as an internal path control unit described in Summary of the Invention. The packet flow controller 87 serves as a separation unit described in Summary of the Invention.

By the management port 81, a centralized control instruction packet and a path information packet provided from the outside of the cluster to be processed by the centralized control apparatus 73 can be connected to the server including the centralized control apparatus 73. The centralized control instruction packet and the path information packet provided from the outside of the cluster to be processed by the centralized control apparatus 73 can also be connected to the server including the centralized control apparatus 73 via the transfer function unit 83.

The external route agent 84 executes processing of connecting to the centralized control apparatus 73 via the management port 81 and the transfer function unit 83 by using information on an internal path generated by the internal route engine 85 as will be described later, and of requesting the centralized control apparatus 73 for path control. The external route agent 84 stores path information from the outside of the cluster processed by the centralized control apparatus 73, in a storage unit (not illustrated) of the external route agent 84. The packet flow controller 87 copies the path information, stored in the external route agent 84, to the transfer function unit 83 via the driver 88. Furthermore, the external route agent 84 can be connected to the centralized control apparatus 73 of another server 62c via the internal route engine 85 and the transfer function unit 83. Thus, the external route agent 84 is an agent for receiving path information from the outside of the cluster and transferring the path information to the centralized control apparatus 73 to be subjected to the centralized control. Then, the external route agent 84 communicates with the centralized control apparatus 73 to transfer a topology resolution communication packet in the cluster and the path information packet from the outside to the centralized control apparatus 73.

The internal route engine 85 processes the internal path information to provide solution for the communication path between the external route agent 84 and the centralized control apparatus 73. The internal route engine 85 provides the solution for the internal path on the basis of the routing protocol as follows. Specifically, the internal route engine 85 prepares a virtual Interface (IF) simulating each port of the transfer function unit 83, in the packet control agent 86. Next, the packet flow controller 87 implements bridging to a port corresponding to the transfer destination in the ports prepared in the packet control agent 86, and transfers a packet related to the internal path of the transfer function unit 83 to the internal route engine 85. The packet thus transferred is processed by the internal route engine 85.

Furthermore, the internal route engine 85 performs path exchange with the internal route engines 85 provided in the transfer apparatuses 61a to 61d in the cluster, and performs path recalculation such as automatically generating a bypass path in response to a failure in the transfer apparatuses 61a to 61d or to a path failure. This path recalculation enables automatic switching of the internal path.

The packet control agent 86 forwards packets acquired by the packet flow controller 87 from the transfer function unit 83, to the internal route engine 85 or the external route agent 84.

The transfer function driver 88 enables the transfer function unit 83 to be controlled, and is in charge of a function for writing the path information to the transfer function unit 83 and transferring a packet, received by the packet control agent 86, from the port of the transfer function unit 83 via the packet flow controller 87. Furthermore, the transfer function driver 88 is in charge of a function enabling a packet addressed to the host apparatus, among packets flowed into the port of the transfer function unit 83, to be transferred to the packet control agent 86 via the packet flow controller 87.

The packet flow controller 87 is in charge of packet separation and control on the transfer function unit as will be described below. Specifically, the packet separation is processing including acquiring packets from the transfer function unit 83 and outputting the packets separately to the internal route engine 85 and the external route agent 84. The control on the transfer function unit 83 includes copying the path information, stored in the internal route engine 85 and the external route agent 84, to the transfer function unit 83 via the driver 88.

If the path information is not copied to the transfer function unit 83, a packet that is input cannot be transferred due to the lack of path information. If there is the path information, the transfer function unit 83 can autonomously determine the transfer destination of the packet.

Furthermore, upon detecting that any of the ports of the transfer function unit 83 is down, the packet flow controller 87 turns off the corresponding port in the virtual IF connected to the internal route engine 85, in order to achieve quick switching in response to a failure such as a path failure or an apparatus failure. This function enables switching to be performed quickly as compared with a case where path recalculation is performed in response to the expiration of a timer of a routing protocol.

Operations in Embodiment

Next, operations performed in the transfer system 60 under path failure will be described with reference to FIGS. 5 to 7.

Figure 5:
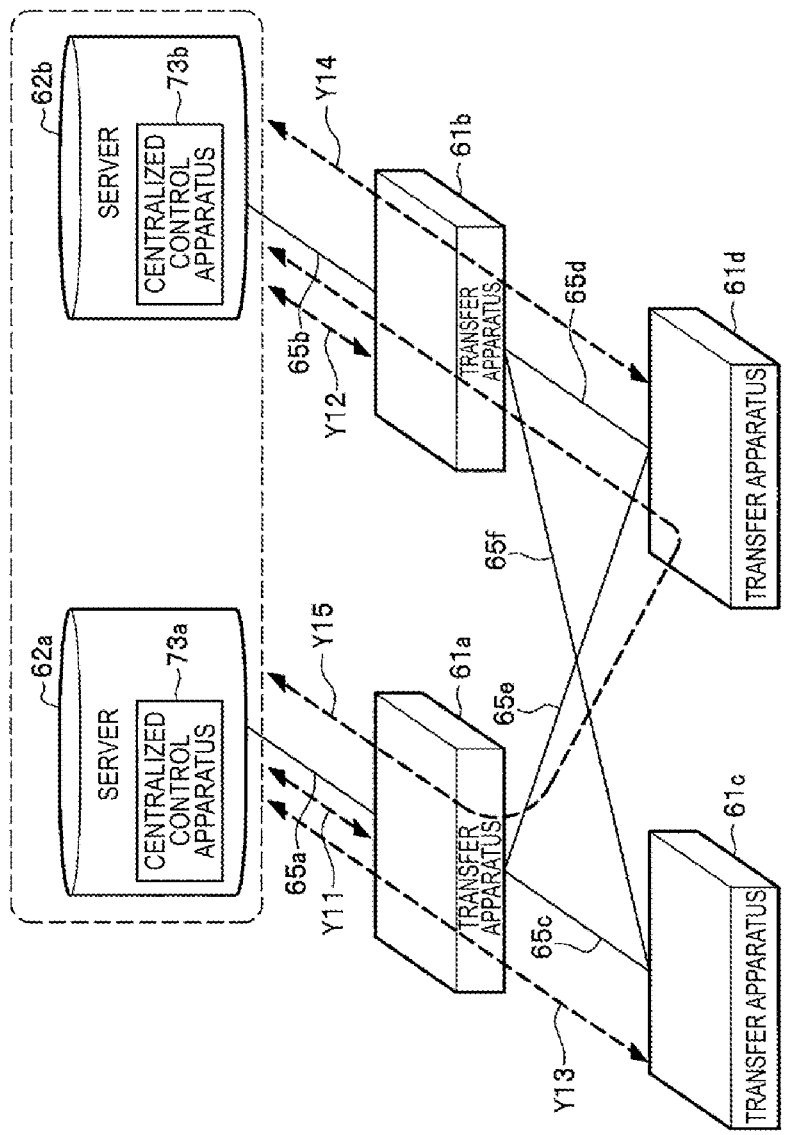
FIG. 5 is a block diagram illustrating a basic configuration for an operation performed when a path inside the switch cluster of the transfer system according to the present embodiment fails.

FIG. 5 is a block diagram illustrating a configuration with the two servers 62a and 62b and the switch cluster including the four transfer apparatuses 61a to 61d. Arrows Y11 through Y14 in FIG. 5 indicate communications between each of the centralized control apparatuses 73a and 73b and each of the transfer apparatuses 61a to 61d for performing centralized control. The arrow Y15 indicates communications for synchronizing information between the two centralized control apparatuses 73a and 73b.

Figure 6:
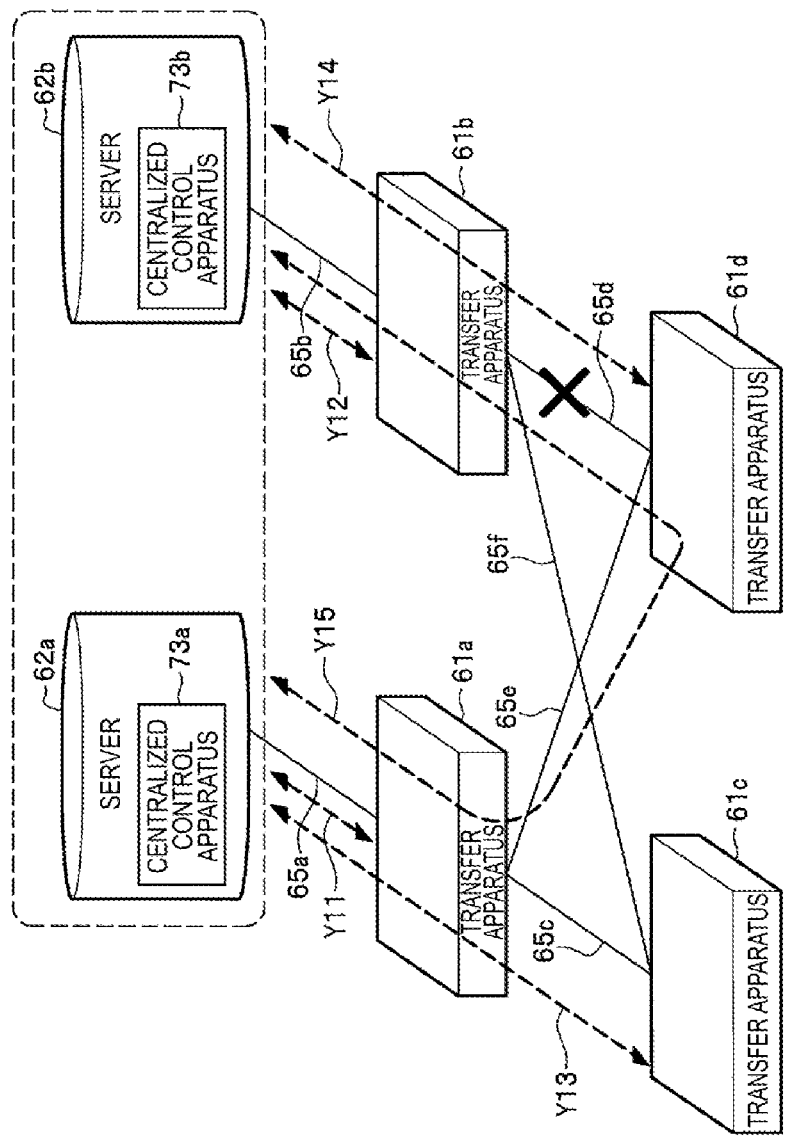
FIG. 6 is a block diagram illustrating a failure of a path inside the switch cluster of the transfer system according to the present embodiment.

It is assumed that during the communications, a failure disabling the communications such as disconnection and the like has occurred on the path 65d as indicated by the x mark in FIG. 6. In this case, packets processed in the cluster and packets from the outside of the cluster which have been traveling through the path 65d can no longer travel between the transfer apparatuses 61b and 61d. In other words, communications between the transfer apparatus 61d and the centralized control apparatus 73b indicated by the arrow Y14 and communications between the centralized control apparatuses 73a and 73b via the transfer apparatuses 61a, 61d, and 61b as indicated by the arrow Y15 are disabled. At this time, the internal route engines 85 (FIG. 4) of the transfer apparatuses 61d and 61b on both sides of the failed path 65d detect the failure on the path 65d.

After the path failure has been detected, the internal route engines 85 of the respective transfer apparatuses 61a to 61d in the cluster perform the path exchange with each other, and perform the path recalculation for autonomously generating a bypass path bypassing the failed path 65d in accordance with the routing protocol.

Figure 7:
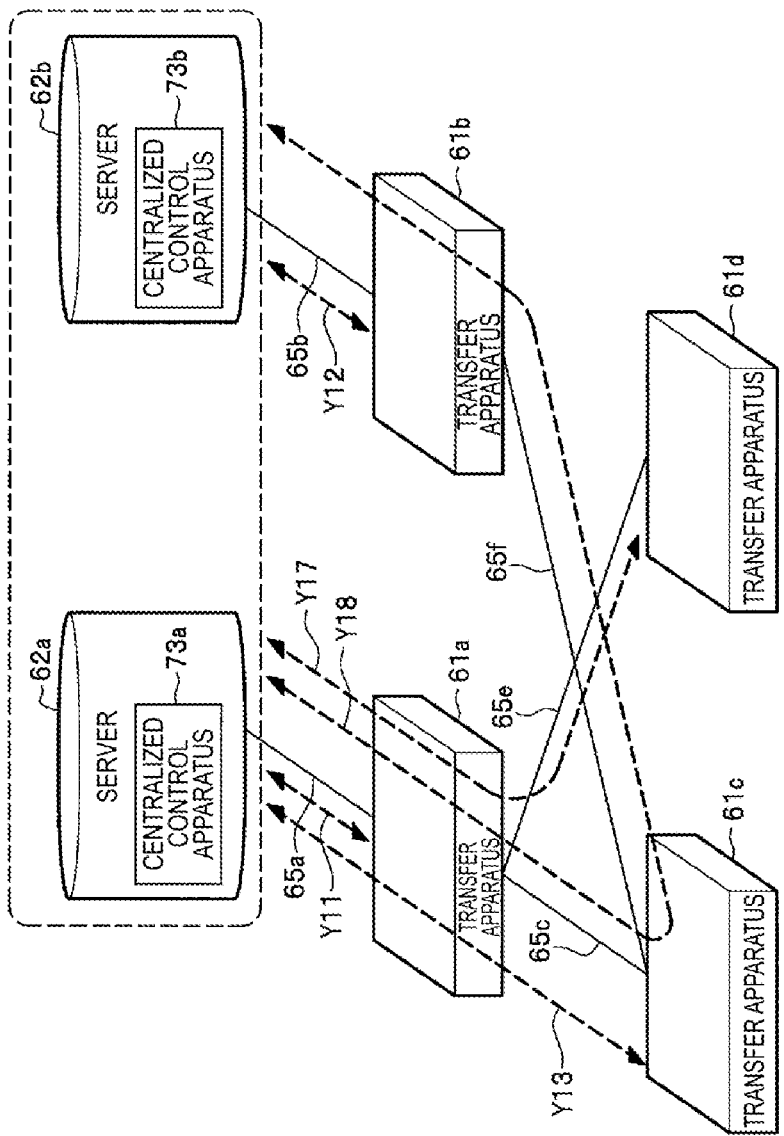
FIG. 7 is a block diagram illustrating a bypass path established after the failure of the path inside the switch cluster of the transfer system according to the present embodiment.

A bypass path indicated by an arrow Y17 (new path Y17) and a bypass path indicated by arrow Y18 (new path Y18) illustrated in FIG. 7 are generated by this path recalculation. The new path Y17 connects the transfer apparatus 61d to the centralized control apparatus 73a via the transfer apparatus 61a. The new path Y18 connects the centralized control apparatuses 73a and 73b to each other via the transfer apparatuses 61a, 61c, and 61b.

The external route agents 84 of the transfer apparatuses 61d and 61a on the path indicated by arrow Y17 are connected to the centralized control apparatus 73a via the new path Y17. As a result, the centralized control apparatus 73 can continue to perform centralized control on the cluster while recognizing the path configuration change in the cluster.

The external route agents 84 of the transfer apparatuses 61a, 61c, and 61b on the path indicated by the arrow Y18 are connected to the centralized control apparatuses 73a and the 73b via the new path Y18 and transfer path information about the new path Y18 to the centralized control apparatuses 73a and the 73b. As a result, the path information about the new path Y18 is stored in the centralized control apparatuses 73a and 73b, whereby the centralized control apparatuses 73a and 73b can communicate with each other through the new path Y18. Thereafter, the external path processing is executed by the centralized control apparatuses 73a and 73ba, and the transfer function unit 83 (FIG. 4) recognizes the new path information via the external route agent 84 (FIG. 4).

The packet flow controllers 87 on the transfer apparatuses 61a to 61d update the transfer function units 83 of the respective transfer apparatuses 61a to 61d using the path information accumulated in the external route agent 84 and the internal route engine 85 through the new paths Y17 and Y18.

Figure 8:
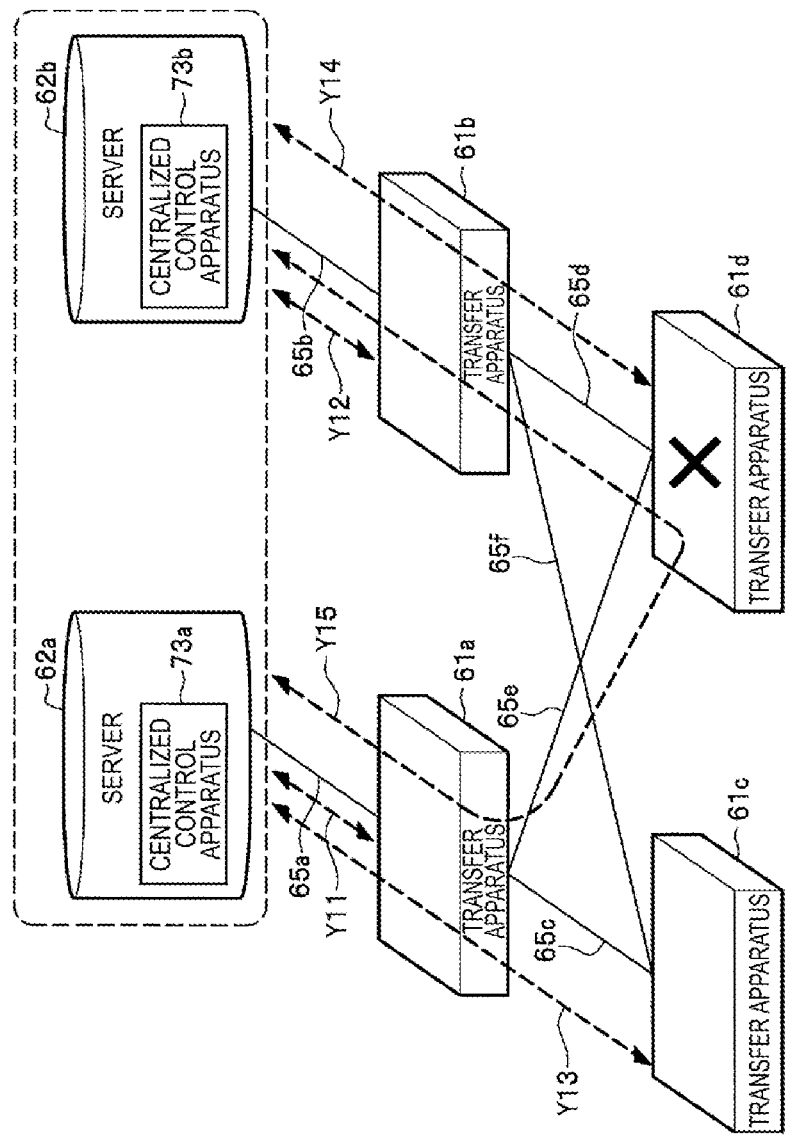
FIG. 8 is a block diagram illustrating a failure of a transfer apparatus inside the switch cluster of the transfer system according to the present embodiment.

Next, a case is assumed where during the communications illustrated in FIG. 5, a failure disabling the communications such as a component failure occurs in the transfer apparatus 61d as indicated by the x mark in FIG. 8. In this case, the paths 65e and 65d connected to the failed transfer apparatus 61*d* are in the failed state. Thus, communications between the transfer apparatus 61*d* and the centralized control apparatus 73*b* via the transfer apparatus 61*b* as indicated by the arrow Y14 are disabled. Furthermore, the communications between the centralized control apparatuses 73*a* and 73*b* via the transfer apparatus 61*d* as indicated by the arrow Y15 are disabled. In this case, the internal route engines 85 of the transfer apparatuses 61*a* and 61*b* connected to the failed transfer apparatus 61*d* detect the failure on the paths 65*e* and 65*d*.

Figure 9:
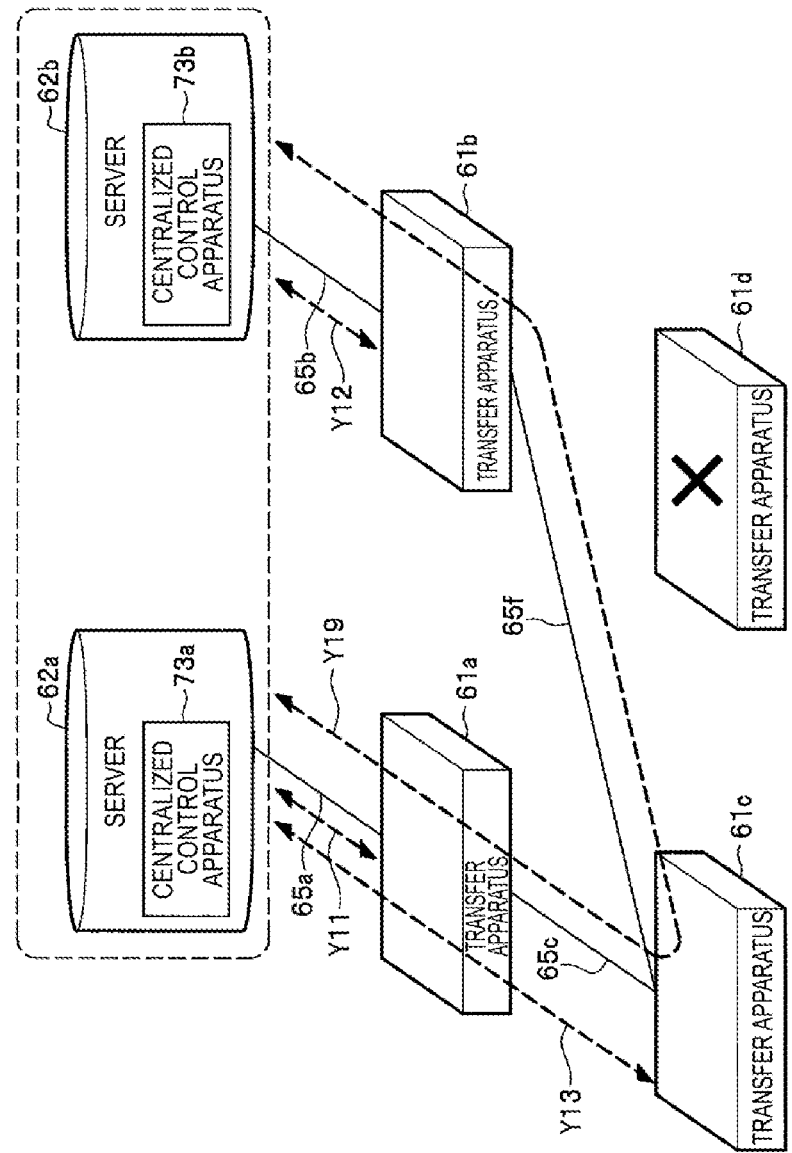
FIG. 9 is a block diagram illustrating a bypass path established after the failure of the transfer apparatus inside the switch cluster of the transfer system according to the present embodiment.
Figure 10:
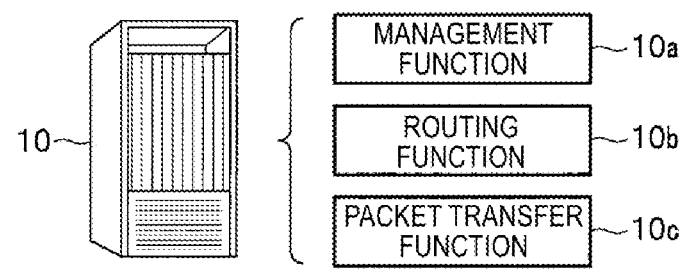
FIG. 10 is a diagram illustrating a configuration of a related-art transfer apparatus.
Figure 11:
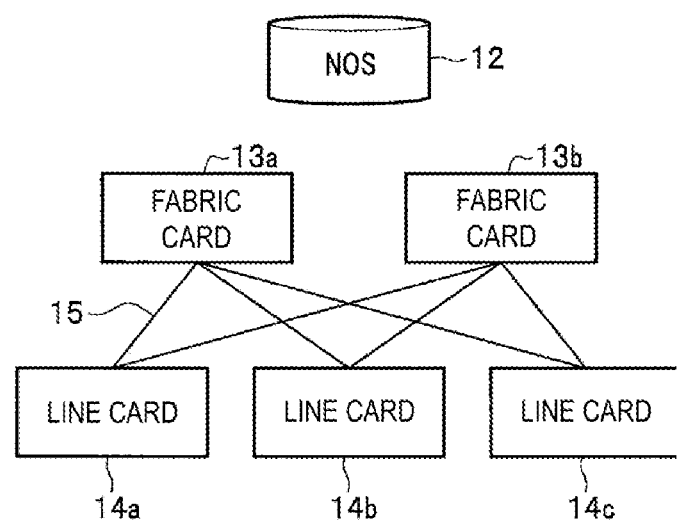
FIG. 11 is a block diagram illustrating a configuration in which fabric cards and line cards that are components contained in the transfer apparatus illustrated in FIG. 10 are connected to each other by a Clos topology in the related-art transfer system.
Figure 12:
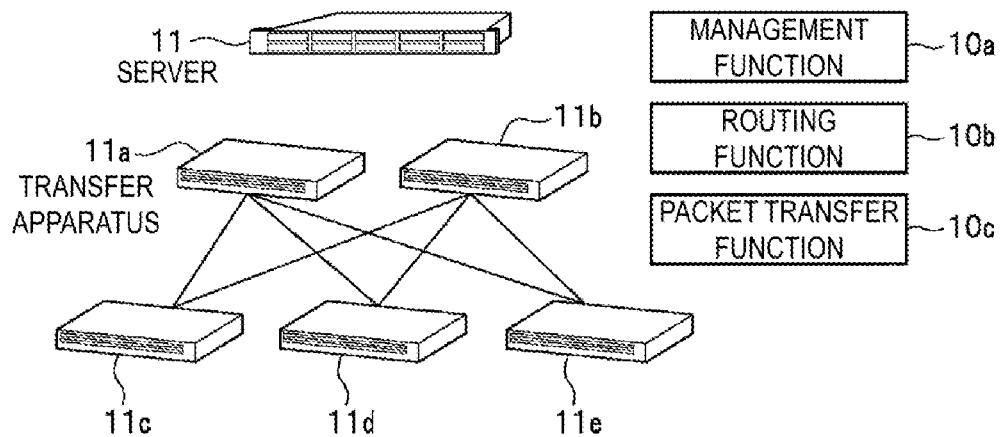
FIG. 12 is a diagram illustrating a configuration in which a switch cluster including a group of transfer apparatuses and a server outside the switch cluster are separately provided.
Figure 13:
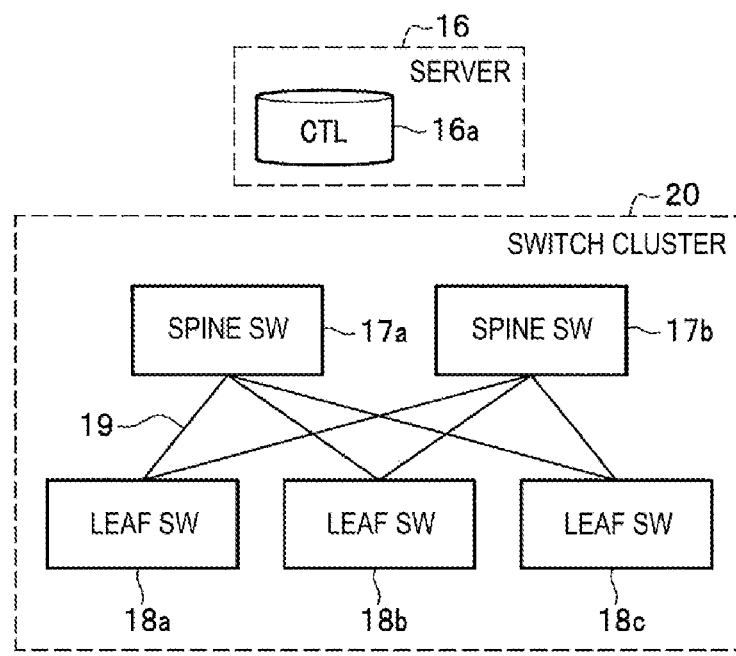
FIG. 13 is a block diagram illustrating a configuration of a related-art transfer system in which spine SWs and leaf SWs that are components contained in the transfer apparatus illustrated in FIG. 12 are connected to each other by a Clos topology.

After this path failure has been detected, the internal route engines 85 of the transfer apparatuses 61*a* to 61*c* connected to each other through the paths 65*c* and 65*f* performs path exchange, and performs the following path recalculation. Specifically, the path recalculation is performed to generate a bypass path that bypasses the failed paths 65*e* and 65*d* on the basis of the autonomous protocol. It is assumed that the bypass path indicated by an arrow Y19 in FIG. 9 (new path Y19) is generated by the path recalculation. The new path Y19 is a path in which the centralized control apparatuses 73*a* and 73*b* are connected to each other via the transfer apparatuses 61*a*, 61*c*, and 61*b* connected to each other via the paths 65*c* and 65*f* in the normal state.

The transfer function units 83 recognize the new path information via the external route agents 84 of these transfer apparatuses 61*a*, 61*c*, and 61*b* in the normal state.

The centralized control apparatuses 73*a* and 73*b* can be connected to each other through the new path Y19 established by the internal route engines 85 on the respective transfer apparatuses. Thereafter, the centralized control apparatuses 73*a* and 73*b* can continue to process the new path information from the outside of the cluster, as in the state before the failure.

It should be noted that when the path failure fails to be recognized by the software on the transfer apparatuses 61*a*, 61*c*, and 61*b*, the internal path cannot be recalculated in response to the path failure detection by the internal route engines 85. However, such a situation also involves no response from the routing protocol, and thus the internal route engines 85 recalculates an alternative path in response to the expiration of a timer usually set for the protocol not responding. Thus, the communications can be resumed on the paths.

To achieve quick path switching in such a case where the packet cannot be transferred but the path is recognized as not being under failure by the software on the transfer apparatuses 61*a*, 61*c*, and 61*b*, the timer of the protocol may be set to be short as much as possible or a failure detection technique such as Bidirectional Forwarding Detection (BFD) may be used in combination. This function allows for quicker automatic path switching than a case of related-art protocol timers, in response to a path failure or a path failure and apparatus failure involving no response from the protocol. The expression "automatic path switching" indicates automatic path switching for enabling the centralized control apparatuses 73*a* and 73*b* to maintain control over the transfer apparatuses 61*a* to 61*d* as a logical node.

Effects of Embodiment

An effect of the transfer apparatuses 61*a* to 61*d* according to the present embodiment will be described. The transfer apparatuses 61*a* to 61*d* perform communications for path control with the centralized control apparatus 73 that performs centralized control from the outside of the cluster 61 including the group of transfer apparatuses 61*a* to 61*d*, through a path similar to D-plane (main signal) serving as a main signal path.

(1) The transfer apparatuses 61*a* to 61*d* each include the packet flow controller 87 serving as a separation unit that separates a packet for the inside of the cluster 61 and a packet for the outside of the cluster 61 transmitted through a path similar to D-plane (main signal) from each other, and the internal route engine 85 that performs path control of obtaining a path for freely passing through a plurality of paths in the cluster 61. The packet flow controller 87 is configured to separate a path control packet for the inside of the cluster 61, and the internal route engine 85 is configured to perform, when the path control packet for the inside thus separated fails to be communicated, path control of generating a path that bypasses a path with the failure.

It should be noted that the packet for the inside is a packet that is transferred only in the cluster 61 and is communicated to maintain centralized control on the cluster 61. Specifically, the packet for the inside includes two communication packets including: a centralized control communication packet that travels through a path similar to D-plane (main signal); and a communication packet that travels through a path similar to D-plane (main signal) for the internal route engines 85 to exchange path information inside the cluster 61. Furthermore, the packet for the outside is a packet such as information about a path outside the cluster 61 transmitted from the outside of the cluster 61 (such as a routing protocol packet and Address Resolution Protocol (ARP) packet).

With this configuration, the packet for the inside of the cluster 61 and the packet for the outside of the cluster 61 can be separated from each other, whereby dynamic path control in the cluster can be implemented independently from the path outside the cluster. Thus, the cluster 61 and the centralized control apparatus 73 outside the cluster can be prevented from having a single point of failure therebetween. Furthermore, in response to a failure of a transfer apparatus or a path in the cluster, a path that bypasses this failed path (bypass path) can be generated so that the communications that have been going on before the failure can be maintained.

(2) The internal route engine 85 is configured to perform, when there are a plurality of connection paths between each of the transfer apparatuses 61*a* to 61*d* and the centralized control apparatus 73 in the cluster 61, path control enabling centralized control communications for these to be distributed among the plurality of paths.

With this configuration, when there are a plurality of paths in the cluster, communications with the centralized control apparatus 73 can be distributed among the plurality of paths. Thus, the cluster 61 and the centralized control apparatus 73 outside the cluster can be prevented from having a single point of failure therebetween.

(3) The internal route engine 85 is configured to perform path control on the internal paths 65*c* to 65*f* of the cluster 61 independently from the external path outside the cluster 61.

With this configuration, the internal paths 65*c* to 65*f* of the cluster are controlled independently from the external path, whereby a bypass path can be generated in response to detection of a failure in the cluster so that the communications that have been going on before the failure can be maintained.

(4) The transfer apparatuses 61*a* to 61*d* are each configured to further include the external route agent 84 that transfers the path control packet for the outside of the cluster 61, separated by the packet flow controller 87, to the centralized control apparatus 73.

With this configuration, the path control packet for the outside of the cluster can be transferred to the centralized control apparatus 73 independently from the path control packet for the inside, whereby the centralized control apparatus 73 can easily perform path control outside the cluster.

(5) The internal route engine 85 is configured to control communications between the centralized control apparatus 73 and a transfer apparatus in the cluster 61 via the internal paths 65*a* to 65*f* of the cluster 61.

With this configuration, communications between the centralized control apparatus 73 and a transfer apparatus inside the cluster can be performed through the bypass path generated by the internal route engine 85 or the like.

The transfer system according to the present embodiment includes the cluster 61 including a group of transfer apparatuses connected to each other through communication paths, and the centralized control apparatus 73 that performs centralized control from the outside of the cluster 61. The centralized control apparatus 73 performs communications for path control on the cluster 61 through a main signal path. The centralized control apparatus 73 is configured to perform, on the basis of the path control packet for the outside of the cluster 61, control on a path to the outside in such a manner that the cluster 61 can be regarded as a single node as viewed from the outside of the cluster 61.

With this configuration, communications can be performed with the group of transfer apparatuses 61*a* to 61*d* in the cluster regarded as a single node from the outside of the cluster. Thus, communications with the group of transfer apparatuses 61*a* to 61*d* can be simplified. In other words, with the apparatuses collectively regarded as a single node, an increase in path information to the outside of the cluster can be suppressed.

Next, a program executed by a computer according to the present embodiment will be described. The computer is assumed to be a transfer apparatus in the cluster 61 that performs path control communications with the centralized control apparatus 73, via a path similar to D-plane (main signal). The centralized control apparatus 73 performs, from the outside, centralized control on the cluster 61 including the group of transfer apparatuses 61*a* to 61*d* connected to each other through paths. This computer is described in claims and includes a CPU or includes both the CPU and a semiconductor chip such as an ASIC in the transfer apparatus.

The program causes the computer to function as the following four units. The first unit performs separation between the packet for the inside of the cluster 61 and the packet for the outside of the cluster 61 that are transmitted through a path similar to D-plane (main signal) or a path similar to that for the main signal. The second unit performs path control to obtain a path for freely passing through the plurality of paths inside the cluster 61. The third unit separates the path control packet for the inside of the cluster 61 by the separating, and generates, in response to a failure to communicate the path control packet for the inside thus separated, a path that bypass the path involving the failure. The fourth unit gives notice of information on the path inside the cluster 61 and the information on the path outside the cluster 61 as the path information used by the packet transfer function (transfer function unit 83).

With this program, effects similar to those obtained by the transfer apparatuses 61*a* to 61*d* can be obtained.

In addition, a specific configuration can be changed as appropriate without departing from the spirit of the present invention.

REFERENCE SIGNS LIST

60 Transfer system
61*a* to 61*d* Transfer apparatus
62*a*, 62*b* Server
63 External router
65*a* to 65*g* Path
74 External routing function
81 Management port
82 Hardware OS
83 Transfer function unit
84 External route agent
85 Internal route engine or autonomous distributed control function (internal path control unit)
86 Packet control agent (separation unit)
87 Packet flow controller (separation unit)
88 Transfer function driver

The invention claimed is:

1. A transfer apparatus that performs communications for path control with a centralized control apparatus via a main signal path, the centralized control apparatus performing centralized control from outside on a switch cluster including a group of transfer apparatuses formed by connecting the transfer apparatus to another transfer apparatus through a communication path, the transfer apparatus comprising:

a separation unit, including one or more processors, configured to separate a path control packet for inside of the switch cluster and a path control packet for outside of the switch cluster from each other, wherein the path control packet for inside of the switch cluster comprises (i) a centralized control communication packet for communications for the centralized control and (ii) a communication packet for exchanging path information inside the switch cluster, wherein both the centralized control communication packet and the communication packet for exchanging path information inside the switch cluster travel over a data signal path, and the path control packet for outside of the switch cluster includes information of routing or address resolution protocols for a path outside the switch cluster; and an internal path control unit, including one or more processors, configured to perform the path control inside the switch cluster, using the separated path control packet for the inside, and the internal path control unit is configured to, in response to detecting a failure occurring inside the switch cluster, obtain a bypass path inside the switch cluster using the path control packet for the inside of the switch cluster, wherein obtaining the bypass path comprises dynamically acquiring a path status and autonomously implementing path calculation by the internal path control unit of the transfer apparatus inside the switch cluster.

2. The transfer apparatus according to claim 1, wherein when the group of transfer apparatuses are connected to each other through a plurality of paths in the switch cluster, the internal path control unit is configured to perform the path control to further enable communications related to the main signal path to be distributed among the plurality of paths.

3. The transfer apparatus according to claim 1, wherein the internal path control unit is configured to perform the path control on a path inside the switch cluster independently from a path outside the switch cluster.

4. The transfer apparatus according to claim 1, further comprising an external route agent configured to transfer to the centralized control apparatus, the path control packet for the outside of the switch cluster, separated by the separation unit.

5. The transfer apparatus according to claim 1, wherein the internal path control unit is configured to control the communications between the centralized control apparatus and the transfer apparatus inside the switch cluster to be performed through a path inside the switch cluster.

6. A transfer system comprising:
a switch cluster including a group of transfer apparatuses formed by connecting a transfer apparatus to another transfer apparatus through a communication path; and
a centralized control apparatus configured to perform centralized control on the switch cluster from outside, the centralized control apparatus configured to perform communications for path control on the switch cluster via a main signal path,
wherein
the centralized control apparatus is configured to perform, based on a path control packet for the outside of the switch cluster, control on a path to the outside to enable the switch cluster to be regarded as a single node from the outside of the switch cluster; and
each of the group of transfer apparatuses comprises a separation unit configured to separate a path control packet for the inside of the switch cluster and a path control packet for the outside of the switch cluster from each other, wherein the path control packet for inside of the switch cluster comprises (i) a centralized control communication packet for communications for the centralized control and (ii) a communication packet for exchanging path information inside the switch cluster, wherein both the centralized control communication packet and the communication packet for exchanging path information inside the switch cluster travel over a data signal path, and the path control packet for outside of the switch cluster includes information of routing or address resolution protocols for a path outside the switch cluster, and an internal path control unit configured to perform path control inside the switch cluster using the separated path control packet for the inside, wherein the internal path control unit is configured to, in response to detecting a failure occurring inside the switch cluster, obtain a bypass path inside the switch cluster using the path control packet for the inside of the switch cluster, wherein obtaining the bypass path comprises dynamically acquiring a path status and autonomously implementing path calculation by the internal path control unit of the transfer apparatus inside the switch cluster.

7. A transfer method performed by a transfer apparatus that performs communications for path control with a centralized control apparatus via a main signal path, the centralized control apparatus performing centralized control from outside on a switch cluster including a group of transfer apparatuses formed by connecting the transfer apparatus to another transfer apparatus through a communication path, the method comprising steps performed by the transfer apparatus of:
separating a path control packet for inside of the switch cluster and a path control packet for outside of the switch cluster from each other, wherein the path control packet for inside of the switch cluster comprises (i) a centralized control communication packet for communications for the centralized control and (ii) a communication packet for exchanging path information inside the switch cluster, wherein both the centralized control communication packet and the communication packet for exchanging path information inside the switch cluster travel over a data signal path, and the path control packet for outside of the switch cluster includes information of routing or address resolution protocols for a path outside the switch cluster;
performing path control of obtaining a path for freely passing through a plurality of paths inside the switch cluster; and
performing path control of a path control packet for the inside of the switch cluster by generating, in response to detecting a failure occurring inside the switch cluster, a bypass path inside the switch cluster using the path control packet for the inside of the switch cluster, wherein generating the bypass path comprises dynamically acquiring a path status and autonomously implementing path calculation by the internal path control unit of the transfer apparatus inside the switch cluster.

8. The transfer method according to claim 7, further comprising:
when the group of transfer apparatuses are connected to each other through a plurality of paths in the switch cluster, performing the path control to further enable communications related to the main signal path to be distributed among the plurality of paths.

9. The transfer method according to claim 7, further comprising:
performing the path control on a path inside the switch cluster independently from a path outside the switch cluster.

10. The transfer method according to claim 7, further comprising transferring to the centralized control apparatus, the path control packet for the outside of the switch cluster.

11. The transfer method according to claim 7, further comprising:
controlling the communications between the centralized control apparatus and the transfer apparatus inside the switch cluster to be performed through a path inside the switch cluster.

* * * * *